(Model.)

R. G. VASSAR.
ALARM LOCK.

No. 478,071. Patented June 28, 1892.

4 Sheets—Sheet 1.

ATTEST:
J. H. Hurdle
Hm. H. Cooper

INVENTOR:
Robert G. Vassar

By H. E. Townsend
Attorney (Model.)

R. G. VASSAR.
ALARM LOCK.

No. 478,071.  Patented June 28, 1892.

4 Sheets—Sheet 2.

ATTEST:
J. Hurdle
Thos H Capes

INVENTOR:
Robert G Vassar
By H. C. Townsend
Attorney

THE NORRIS PETERS CO., PHOTO-LITHO., WASHINGTON, D. C.

(Model.)

4 Sheets—Sheet 3.

R. G. VASSAR.
ALARM LOCK.

No. 478,071.

Patented June 28, 1892.

ATTEST:

INVENTOR:
Robert G Vassar

By H. L. Townsend
Attorney (Model.)
R. G. VASSAR.
ALARM LOCK.
No. 478,071.
4 Sheets—Sheet 4.
Patented June 28, 1892.
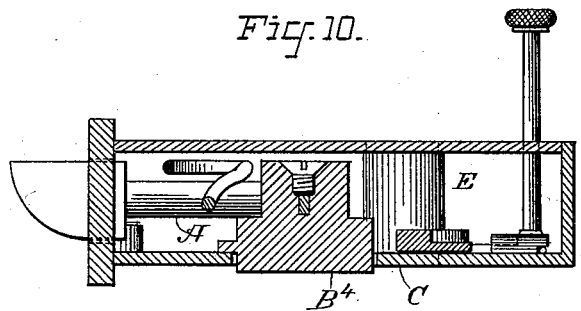
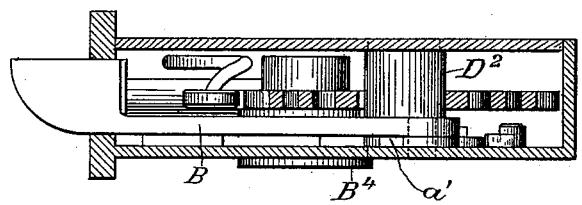
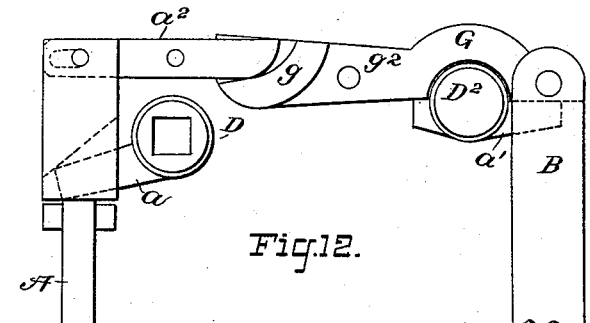
ATTEST:
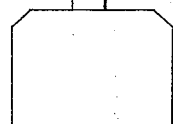
INVENTOR:
Robert G Vassar
By H. L. Townsend
Attorney

UNITED STATES PATENT OFFICE.

ROBERT G. VASSAR, OF NEW YORK, N. Y.

ALARM-LOCK.

SPECIFICATION forming part of Letters Patent No. 478,071, dated June 28, 1892.

Application filed November 2, 1889. Serial No. 329,004. (Model.)

*To all whom it may concern:*

Be it known that I, ROBERT G. VASSAR, a citizen of the United States, and a resident of New York, in the county of New York and State of New York, have invented a certain new and useful Mortise Alarm-Lock, of which the following is a specification.

My invention relates generally to the construction of mortise alarm-locks; and it consists, among other things, in a new manner of combining the lock-bolt and a knob-latch, whereby the knob-latch may be operated simultaneously with the lock-bolt or may be used independently thereof without setting off the alarm.

My invention consists, also, in the further details and combinations of parts more particularly hereinafter described, and then specified in the claims.

Figure 1:
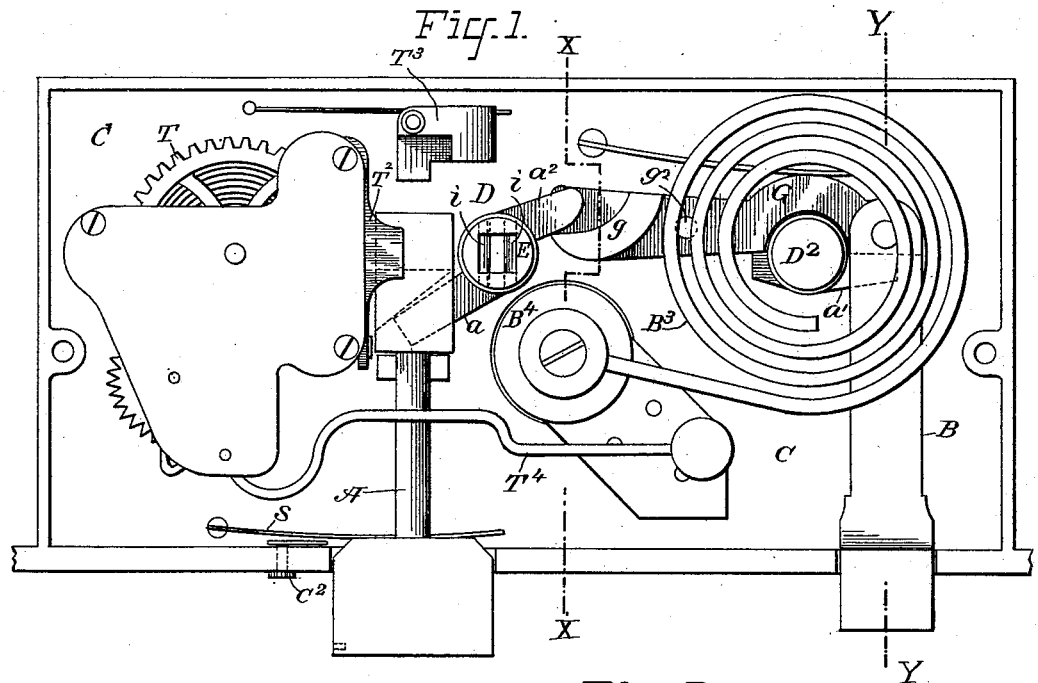
Figure 2:
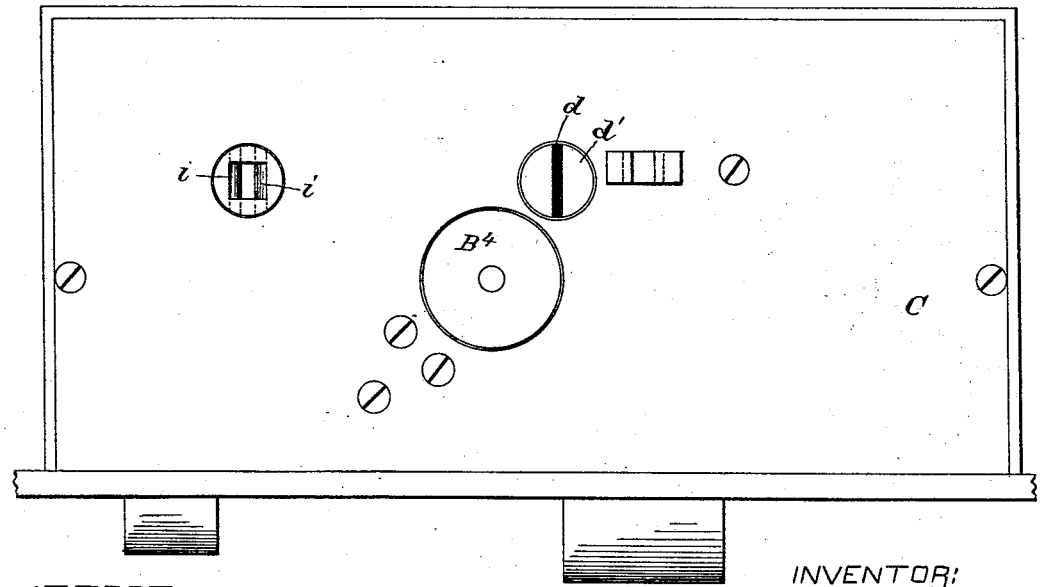
Figure 3:
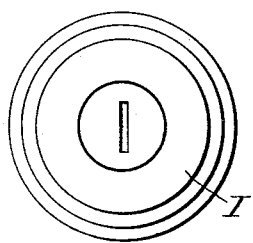
Figure 4:
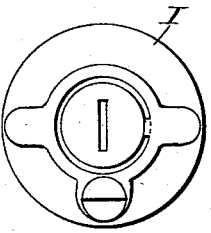
Figure 5:
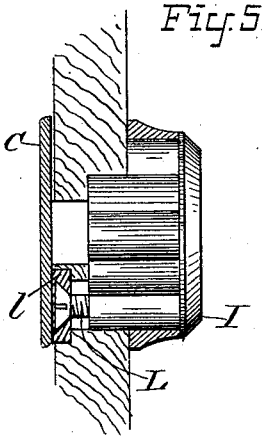
Figure 14:
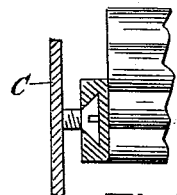
Figure 6:
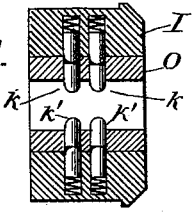
Figure 7:
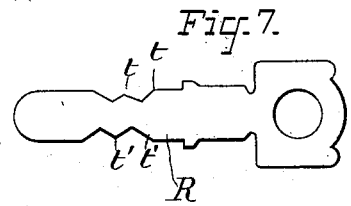
Figure 8:
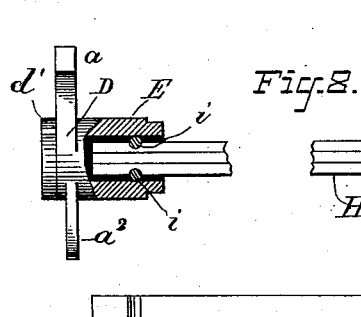
Figure 13:
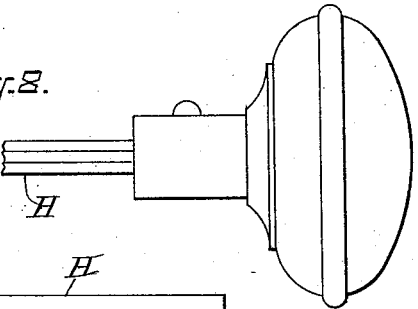
Figure 9:
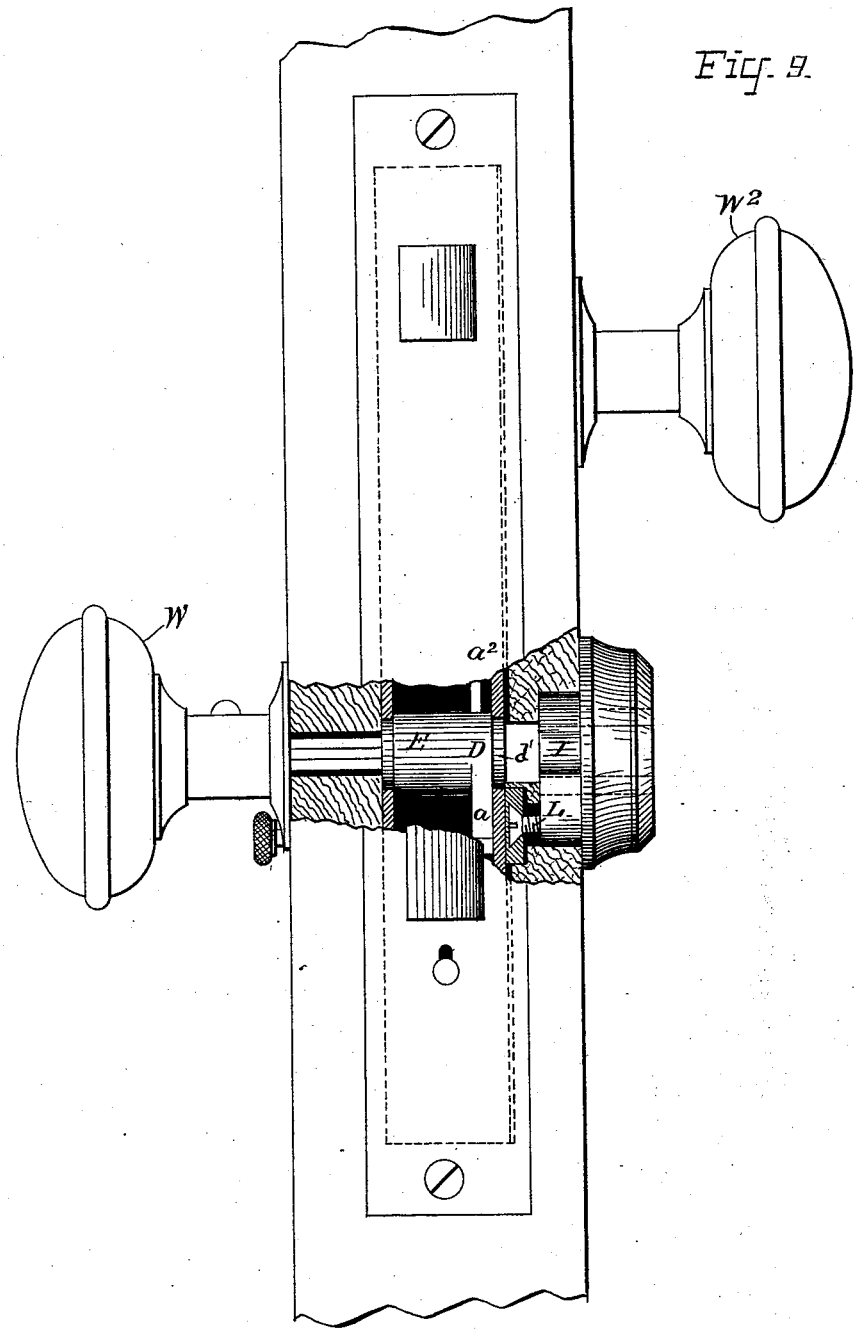

In the accompanying drawings, Figure 1 is a plan of the mechanism of the lock embodying my invention. Fig. 2 is a reversed plan of Fig. 1 and shows the reverse side of the bed-plate or lock upon which the parts are mounted. Fig. 3 is a face view of the escutcheon and key-barrel. Fig. 4 is a reverse view of the same. Fig. 5 is a side elevation of the escutcheon and shows in vertical section a part of the bed-plate to illustrate the manner of connecting the escutcheon or sleeve of the barrel with the bed-plate so that the parts may be held in place. Fig. 6 is a longitudinal cross-section of the escutcheon or sleeve and key-barrel. Fig. 7 is a side elevation of the key. Fig. 8 shows the roll-plate and knob-spindle in side elevation, the hub of the roll-plate being shown in section to illustrate the manner of connecting the knob-spindle with it. Fig. 9 is an edge view of the door to which my improved lock is applied with parts broken away. Fig. 10 is a cross-section on the line X X, Fig. 1. Fig. 11 is a cross-section on the line Y Y, Fig. 1. Fig. 12 illustrates a modification in the connection of the knob-latch with the lock-bolt. Fig. 13 is a side view of one of the plates or pieces of which the sectional knob-spindle is made. Fig. 14 is a modification of the pieces for fastening the escutcheon or sleeve of the rotatable barrel in place.

C indicates the bed-plate or support upon which part of the mechanism is mounted, and which may form likewise a side of the casing for such mechanism.

A is the lock-bolt, adapted to be operated by a key from the outside of the door, as hereinafter described, or by a knob on the inside of the door.

B is the knob-latch, which may be operated by a knob $W^2$ from the outside of the door or by the operation of the key, as hereinafter described, which acts on the lock-bolt, or by the operation of the knob W on the inside of the door.

The lock-bolt A is preferably a spring-actuated lock-bolt, the spring of which (indicated at S) tends to throw out the bolt. Combined with said bolt is the usual catch $C^2$, adapted to enter a notch in the head of the bolt, so as to hold the same retracted when it is desired that the bolt shall be held only by the knob-latch.

The bolt A is retracted by means of a roll-back D or similar mechanism formed as a plate or block adapted by rotation to actuate such bolt. In the present instance the roll-back has a plate or extension $a$, which engages with a shoulder or projection upon the lock-bolt for this purpose. The knob W has a spindle which connects with the roll-back plate by attachment to a hub E, as indicated more fully in Figs. 8 and 9, and as will be more particularly described farther on. The roll-back or other mechanism is likewise provided with a slot $d$ in the face of the hub, (indicated at $d'$,) which fits in the opening in the bed-plate C, opposite the opening through which the key may be inserted from the outside of the door for engagement with such roll-back plate. A key of the form suitable for the purpose is indicated at Fig. 7 as a flat key whose end may enter the slot $d$, so that in turning the key the roll-back will throw back the bolt A.

$D^2$ is the hub with which the spindle of the knob $W^2$ connects in any suitable manner and which operates on the knob-latch B by any ordinary or desired mechanism—as, for instance, by an arm $a'$, that engages with the pin on the latch B.

G is a lever pivoted at $g^2$ and connected with the knob-latch B. This lever extends, as shown, toward the lock-bolt for engagement with some part moving with the lock-bolt when the latter is retracted, whereby the knob-latch will be retracted at the same time with the lock-bolt when the latter is actuated either by the key or by the knob W. For the sake of simplicity I prefer to employ for this purpose an extension or arm $a^2$, engaging with one side of a projection $g$ on lever G. As will be obvious, when the roll-back D turns to throw the bolt A the arm $g^2$ will engage with lever G and retract the latch-bolt B. It is not necessary that the part moving with the lock-bolt and actuating the knob-latch should be the roll-back plate or an extension therefrom, as it is obvious, as indicated in Fig. 12, an entirely separate lever $A^2$ might be employed and connected to the lock-bolt, so as to move with it and operate the lever G. In this instance the extension $a^2$ from the roll-back D would be unnecessary. I prefer, however, to operate the lever G by some part attached to the roll-back or other mechanism which is actuated by the key for throwing the lock-bolt, although, as clearly indicated, it is obvious that the knob-latch might be actuated by any other part moving with the lock-bolt.

The spindle of the knobs is constructed, as shown at H, Fig. 8, from three separate bars or rods placed flatwise together. The two outer bars have notches in their sides, as indicated in the plan, Fig. 13, and the hub of the roll-back or other device has pins $i\ i$, Figs. 1 and 8, which engage with the notches in said plates. The lock-case having been slipped into place and a mortise provided for it in the door, an opening is formed opposite the hub and the two outer plates of the compound spindle are inserted into the opening in the hub, with their notches engaging with the pin, after which the metal plate is inserted to hold the two outer plates spread in engagement with the pins. The knob is then applied and fastened by a suitable screw. The two outer plates being held spread, as described, in engagement with the pins, it is obvious that the spindle cannot be detached from the hub of the roll-back. The key R, which engages with the roll-back D, is inserted for that purpose through the rotatable barrel O, which is adapted to rotate in the sleeve or escutcheon I, mounted in the face of the door. The barrel O carries tumblers that hold the same against rotation in the escutcheon, excepting when lifted to a certain position by the key, as well understood in the art.

In locks of this construction it has heretofore been customary to fasten the escutcheon in place by screws entering from the rear and to connect the rotatable barrel with the roll-back plate by means of what is termed a "crowding" or "connecting" bar, and so organize the parts that the key may enter directly into engagement with the roll-back plate. The sleeve or escutcheon is fastened in place by engagement directly with the bed plate or case of the lock which carries the interior mechanism and in such way that it cannot be detached. For this purpose I provide either the bed-plate or the escutcheon or sleeve with a pin or stud L, which engages with a slot in a projection $l$ in the other. This slot $l$ is formed so that after the escutcheon has been placed in position the lock may be slipped into place in its mortise and the engagement of the pin with the part $l$ will be at the same time effected. In order to permit the connection to be readily made for varying distances between the inner side of the escutcheon and the lock and bed-plate, I make this pin L adjustable, so that its extent of projection may be varied by screwing it in and out on its support. This pin or stud, as I have indicated, may be either upon the lock, bed-plate, or escutcheon or sleeve I. It is preferable, however, to place it on the latter. The projection $l$, slotted or formed to be engaged by the head of the pin L, may be placed on any of the fixed supporting parts which are inserted into the mortise when the lock is put in place therein. As already indicated, the pin might be on the lock bed-plate, as shown in Fig. 14, and the slot with which the head of the pin engages placed on the escutcheon or sleeve of the rotatable barrel.

In order to add to the number of changes which may be made with a lock of the kind described, I provide the barrel O with two sets of tumblers $k\ k$ and $k'\ k'$, placed diametrically opposite therein, and make the key R with two sets of wards $t\ t$ and $t'\ t'$ for lifting said tumbler. These two sets of wards are placed at opposite edges of the key, as shown in Fig. 7.

The lock-bolt A is adapted to release an alarm mechanism, a wheel of the train of which is indicated at T. For this purpose a detent-lever for said alarm mechanism (indicated at $T^2$) is arranged to overhang the bolt, so that on a lateral movement of the same the alarm mechanism will be released. A cam $T^3$, placed in the path of the bolt when retracted, may be turned into position, so that if the bolt be thrown back it will ride on said cam and be thrown sidewise to release the alarm. When the bolt is shot and the door is closed, an attempt to open the door will cause the inner end of the same to swing sidewise and release the alarm mechanism.

The bell-hammer of the alarm mechanism is indicated at $T^4$, and the bell or gong on which it operates is indicated at $B^3$. This bell is mounted on a stud or post $B^4$, which projects through the bed plate or casing slightly, as indicated better in Figs. 10 and 11, so that when the case is placed in the mortise in the door the parts will be crowded firmly against the woodwork, thereby giving the bell or gong a support upon a large resonant surface and adding greatly to the sound. In applying the alarm-lock the mortise should be cut just wide enough to admit the casing, so that snug contact will be made between the stud and the woodwork when the case is inserted. The stud or post is separated from the casing or bed-plate, except at the point of attachment at one side of the stud, as indicated in the drawings, thus detaching the gong or bell as far as possible from the dead-surface of the bed-plate and leaving it free to communicate its vibrations to the woodwork.

By the construction described it is obvious that the key when used to throw back the bolt A will also by engagement of the arm $a^2$ of lever G throw back the knob-latch, thus making it unnecessary to take hold of the knob-latch $W^2$. It is also obvious that when the lock-bolt A is fully retracted and is held in place by the catch $C^2$ the knob-latch B may be operated in the ordinary manner by means of the knob $W^2$ without interference from the mechanism used in actuating the lock-bolt A. It is therefore possible for the occupant of an apartment to set the apparatus so that the door may be freely entered by lifting the knob $W^2$ without setting off the alarm.

When it is desired that the occupant should be free to leave an apartment without operating the alarm, the cam $T^3$ is turned down into the position shown in Fig. 1, and the turning of the knob W will operate not only the bolt A, but will throw back the knob-latch B.

What I claim as my invention is—

1. The combination, with the lock-bolt having a catch for holding it retracted and the knob-latch having a knob for throwing it back, of a lever connected with the latter and engaged on its rear side by a part connected with the lock-bolt when the latter is thrown back, whereby the knob-latch will be retracted simultaneously with said lock-bolt when the latter is thrown back and the knob-latch may be operated freely when the lock-bolt is held back by the catch.

2. The combination, substantially as described, of a lock-bolt, the roll-back acting upon the same, an arm extending from said roll-back, a lever engaged by the said arm, and the knob-latch connected with said lever, as described, so as to be retracted when the roll-back is turned to retract the lock-bolt.

3. The combination of a lock-bolt, a knob-latch having a suitable knob whereby it may be retracted independently of the lock-bolt, and the roll-back or its equivalent, as described, having one arm engaging with the lock-bolt and an opposite arm for operating said knob-latch, and a key for the lock-bolt engaging with said roll-back for turning the same.

4. The combination, substantially as described, of a lock-bolt, a roll-back having an arm engaging therewith and a slot in its face for engagement by a key, a knob-latch having a suitable knob whereby it may be retracted independently of the lock-bolt, and a lever pivoted between the knob-latch and the lock-bolt, engaging at one end with the knob-latch and at its other engaged by an arm or projection from the roll-back which operates on the lock-bolt, as and for the purpose described.

5. In a mortise-lock, the combination of the escutcheon or sleeve in which the rotary barrel is mounted, and the lock or casing interlocking with said sleeve or escutcheon by sidewise movement when it is slipped into its mortise, as and for the purpose described.

6. In a mortise-lock, the combination, with the escutcheon, of the lock-bed plate or casing, and the intermediate adjustable locking pin or stud adjustable on one of the said parts and engaging with the other, so as to prevent detachment of the escutcheon.

7. In a mortise alarm-lock, the gong or bell mounted on a stud which is fastened to the bed-plate, but is separated therefrom, except at the point of attachment, to one side of said stud, said stud or bolt projecting slightly beyond the bed-plate, so as to bear firmly against the woodwork in which the mortise is formed.

8. The combination, with the knob and the hub, of the connecting spindle formed in three longitudinal sections the outer two of which are notched for engagement with pins of the hub, while the center section is adapted to be inserted between the two hubs and to hold them engaged, as and for the purpose described.

Signed at New York, in the county of New York and State of New York, this 23d day of October, A. D. 1889.

ROBERT G. VASSAR.

Witnesses:
WM. H. CAPEL,
HUGO KOELKER.